(12) United States Patent
Mondinelli

(10) Patent No.: US 11,815,194 B2
(45) Date of Patent: Nov. 14, 2023

(54) ON/OFF VALVE FOR A HIGH PRESSURE GAS TANK, PARTICULARLY FOR AUTOMOTIVE HYDROGEN FUEL CELL SYSTEM

(71) Applicant: OMB SALERI S.P.A.—SOCIETA' BENEFIT, Brescia (IT)

(72) Inventor: Francesco Mondinelli, Brescia (IT)

(73) Assignee: OMB SALERI S.P.A.—SOCIETA' BENEFIT, Brescia (IT)

( * ) Notice: Subject to any disclaimer, the term of this patent is extended or adjusted under 35 U.S.C. 154(b) by 0 days.

(21) Appl. No.: 17/755,733

(22) PCT Filed: Nov. 2, 2020

(86) PCT No.: PCT/IB2020/060263
§ 371 (c)(1),
(2) Date: May 6, 2022

(87) PCT Pub. No.: WO2021/090139
PCT Pub. Date: May 14, 2021

(65) Prior Publication Data
US 2022/0410698 A1    Dec. 29, 2022

(30) Foreign Application Priority Data

Nov. 6, 2019 (IT) .................... 102019000020462

(51) Int. Cl.
*F16K 31/40* (2006.01)
*F16K 31/06* (2006.01)
*B60K 15/03* (2006.01)

(52) U.S. Cl.
CPC ........ *F16K 31/408* (2013.01); *F16K 31/0658* (2013.01); *B60K 2015/03026* (2013.01)

(58) Field of Classification Search
CPC ............... F16K 31/408; F16K 31/0658; B60K 15/03006; B60K 2015/03026
See application file for complete search history.

(56) References Cited

U.S. PATENT DOCUMENTS

| 1,807,191 A | * | 5/1931 | Boyle | ................ F16K 31/408 251/38 |
| 2,084,030 A | * | 6/1937 | Hoppe | ................ F16K 31/408 251/38 |
| 4,526,340 A | * | 7/1985 | Kolchinsky | ........... F16K 31/408 251/38 |

(Continued)

FOREIGN PATENT DOCUMENTS

BE    559830 A    8/1957
DE    1168725 B    4/1964

OTHER PUBLICATIONS

International Search Report and Written Opinion for International Patent Application No. PCT/IB2020/060263, dated Dec. 17, 2020, 11 pages.

*Primary Examiner* — Umashankar Venkatesan
(74) *Attorney, Agent, or Firm* — Armstrong Teasdale LLP

(57) ABSTRACT

An electrically-operated ON/OFF valve for a high pressure hydrogen tank for an automotive fuel cell system has a valve body, a solenoid group, a first gate that achieves a first-stage seal, and a sealing element provided with a main sealing surface to achieve a second-stage seal. The first-stage seal and the second-stage seal are both achieved by the sealing element.

10 Claims, 8 Drawing Sheets

(56) References Cited

U.S. PATENT DOCUMENTS

| | | | |
|---|---|---|---|
| 5,205,531 A | 4/1993 | Kolchinsky | |
| 11,566,712 B2* | 1/2023 | Renollett | F16K 1/427 |
| 2014/0042352 A1* | 2/2014 | Zieger | F16K 31/408 |
| | | | 251/129.15 |
| 2015/0337972 A1* | 11/2015 | Hayasaka | F16K 31/0624 |
| | | | 137/625.33 |
| 2016/0305572 A1 | 10/2016 | Becker et al. | |

* cited by examiner

ON/OFF VALVE FOR A HIGH PRESSURE GAS TANK, PARTICULARLY FOR AUTOMOTIVE HYDROGEN FUEL CELL SYSTEM

CROSS-REFERENCE TO RELATED APPLICATIONS

This application is a National Stage Application of International Patent Application No. PCT/IB2020/060263, having an International Filing Date of Nov. 2, 2020, which claims priority to Italian Patent Application No. 102019000020462, filed Nov. 6, 2019, the entire contents of each of which are hereby incorporated by reference herein.

FIELD OF THE INVENTION

The present invention relates to a valve which is applicable to a tank, usually on board a vehicle, for managing the high pressure hydrogen flow in an automotive hydrogen fuel cell system.

In particular, the present invention relates to an electrically-controllable ON/OFF valve for allowing or inhibiting the hydrogen to leave the tank.

BACKGROUND OF THE INVENTION

The gas in an automotive hydrogen system is stored in the tank at a very high pressure, which usually reaches 700 bar.

This means that manufacturing an ON/OFF valve is to be highly accurate, especially with regard to the contrivances required to avoid gas leaks, for example at the valve gate.

In this respect, two contrasting needs are noted in the specific field: on the one hand, there is a need to provide the gate with an effective seal to avoid the occurrence of leaks; on the other, there is a need to make such seals from sufficiently hard materials to resist the action of the high pressure hydrogen. However, seals made from hard materials require more accurate processing operations, so leaks do not arise. Certain embodiments are disclosed in documents US-A1-2016/305572, US-A1-2014/042352 and U.S. Pat. No. 5,205,531.

SUMMARY OF THE INVENTION

It is the object of the present invention to manufacture an ON/OFF valve for high pressure hydrogen tanks which meets the needs of the field while overcoming the drawbacks indicated with reference to the prior art.

Such an object is achieved by an ON/OFF valve as described and claimed herein. Advantageous embodiments of the present invention are also described.

BRIEF DESCRIPTION OF THE FIGURES

The features and advantages of the ON/OFF valve according to the present invention will become apparent from the following description, given by way of a non-limiting example, according to the accompanying drawings, in which.

DETAILED DESCRIPTION

Figure 1:
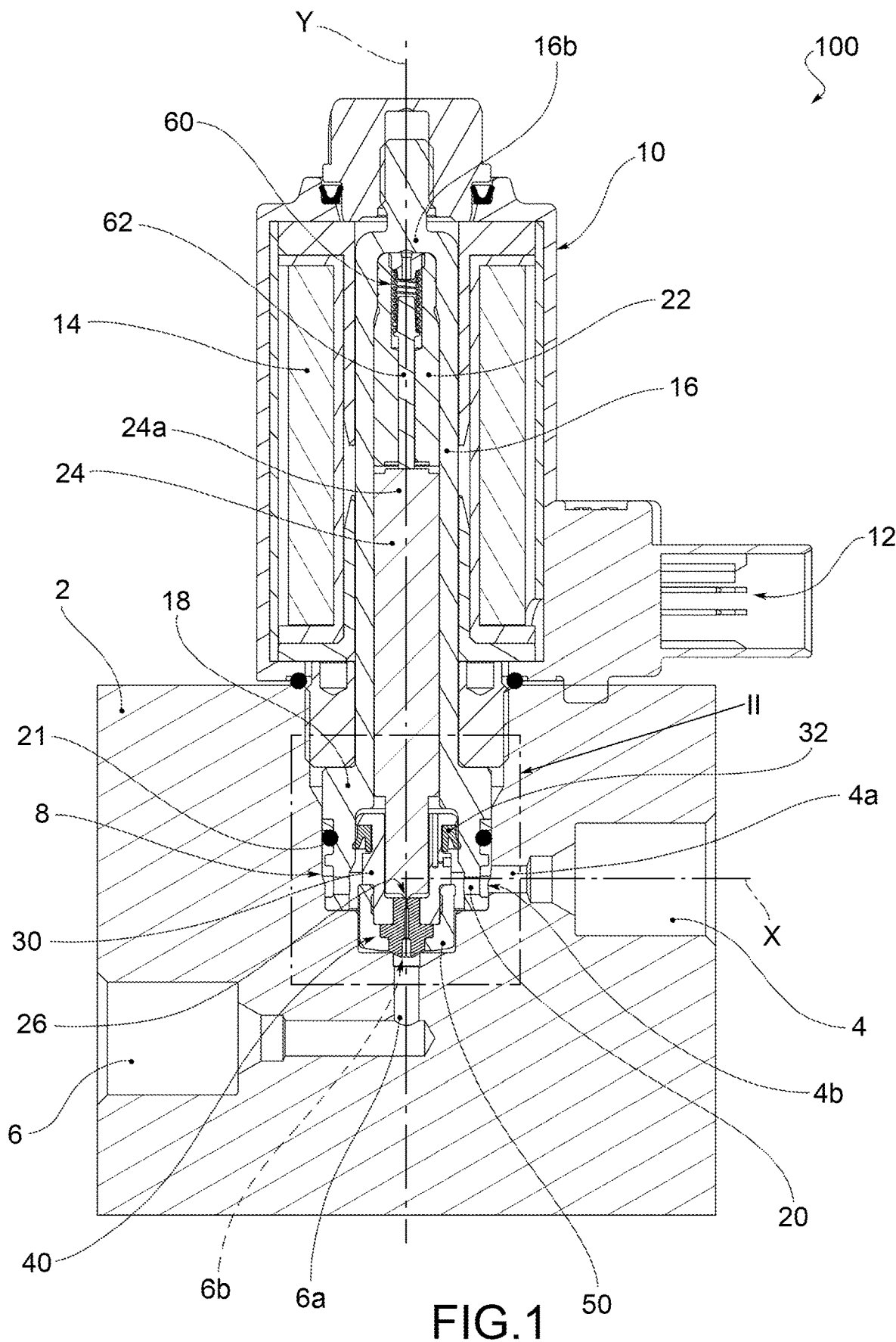
FIG. 1 shows a section of an ON/OFF valve according to an embodiment of the present invention, in a closing configuration.

With reference to the accompanying drawings, an electrically-operated ON/OFF valve for a tank containing high pressure gas, in particular hydrogen, is indicated as a whole by numeral 1. In the case of application to an automotive system, the hydrogen is conventionally stored in the tank at a pressure of 700 bar.

Valve 1 comprises a valve body 2 which is applicable to the tank, for example by means of a threaded neck; an inlet duct 4 in connection with the inside of the tank, an outlet duct 6 in connection with components of the automotive system downstream of the tank, and a main seat in which the inlet duct 4 opens and from which the outlet duct 6 leaves, are obtained in the valve body 2.

According to a preferred embodiment, the inlet duct 4 particularly comprises an end section 4a having a first axis X which opens in the main seat 8 with an inlet port 4b; the outlet duct 6, having a second axis Y, comprises an initial section 6a which leaves the main seat 8 with a port 6b.

The first axis X preferably is orthogonal to the second axis Y.

The main seat 8 preferably is cylindrical and coaxial to the second axis Y.

Valve 1 further comprises an internally hollow casing 10 applied outside the valve body 2 at the opening to access the main seat 8. Casing 10 comprises a socket for an electrical connection for controlling the opening of the valve.

Valve 1 further comprises a winding 14, for example made of copper, housed in casing 10 and electrically connected to socket 12 so that the supply of electric current to socket 12 generates a magnetic field about winding 14 in order to magnetically control the opening of valve 1.

Moreover, valve 1 preferably comprises a tubular-shaped fixed jacket 16 which extends into winding 14 and, protruding from casing 10, into the main seat 8 of the valve body 2.

In particular, jacket 16 comprises a tubular end portion 18 entirely housed in the main seat 8, which is provided with a plurality of jacket passages 20, for example obtained as through holes through the thickness of said end portion 18; said passages 20 are adapted to put the inlet duct 4 in communication with the space inside the end portion 18 of jacket 16.

A jacket seal 21, consisting of a sealing ring, adapted to prevent the leak of high pressure gas towards the external environment, is arranged between the end portion 18 and the surface of the main seat 8.

Valve 1 further comprises a magnetizable fixed core 22 housed in jacket 16, outside the main seat 8, and a magnetizable movable core 24 housed in jacket 16, which extends from a section 24a which is proximal to the fixed core 22 up to reaching the interior of the end portion 18 of jacket 16.

Casing 10, winding 14, fixed core 22 and movable core 24 form a solenoid group 100 which is electrically excitable by operating valve 1.

The movable core 24 carries a first gate 26 on the distal part with respect to the fixed core 22, for example made in one piece with an end section 24b of the movable core 24 and consisting of a sharp protrusion protruding from said end section 24b.

Valve 1 further comprises a drawer 30 slidably and sealingly housed in the end portion 18 of jacket 16; drawer 30 is preferably fitted on the end section 24b of the movable core 24, from which the first gate 26 protrudes.

Drawer 30 carries a drawer seal 32 housed in a specific annular seat, for example consisting of a seal ring with lips, adapted to obtain a sliding seal between drawer 30 and an inner surface 18i of the end portion 18 of jacket 16.

In virtue of said drawer seal 32, the compartment inside the end portion 18 remains separate from a downstream area 34, arranged on the side of the initial section 6a of the outlet duct 6, and an upstream area 36.

Drawer 30 further includes a calibrated drawer passage 38, which puts the downstream area 34 in communication with the upstream area 36.

Valve 1 further comprises a sealing element 40 made in one piece, preferably of a polymeric material, for example a thermoplastic material, for example PEEK (PolyEther Ether Ketone), PAI (Polyamide-Imide) or VESPEL.

The sealing element 40 is carried by drawer 30 at an end portion 30a of drawer 30, which is proximal to port 6b of the initial section 6a of the outlet duct 6.

The sealing element 40 is frontally provided with a main flared sealing surface 42 adapted to achieve a seal for the pressurized gas when it acts in conjunction with port 6b of the initial section 6a of the outlet duct 6, and in particular when it forcibly abuts against the peripheral edge of said port 6b.

The sealing element 40 is further provided with an element passage 44 which puts an inner area of the main sealing surface 42 in communication with the compartment inside drawer 30, in which the first gate 26 is housed.

The element passage 44 opens in the compartment inside drawer 30 with an opening 46; the first gate 26 is engageable with opening 46 to sealingly close the element passage 44.

Moreover, in order to lock the sealing element 40 to drawer 30, valve 1 preferably comprises a fastening body which is screwable outside the end portion 30a of drawer 30 so that the sealing element 40 is encapsulated between the fastening body 50 and the end portion 30a.

Valve 1 further comprises means for biasing the solenoid group 100, adapted to permanently operate on the movable core 24 to keep the first gate 26 in a closing position in which it closes opening 46 of the sealing element 40. Accordingly, since the sealing element 40 is integral with drawer 30, the biasing means also operate to keep the sealing element 40 forcibly abutting against port 6b of the initial section 6a of the outlet duct 6.

According to a preferred embodiment, said biasing means comprise a spring 60, for example housed in a compartment inside the fixed core 22 and placed to abut against a bottom 16b of jacket 16, and a stem 62 which extends between the spring 60 and the movable core 24, crossing said fixed core 22.

Figure 2:
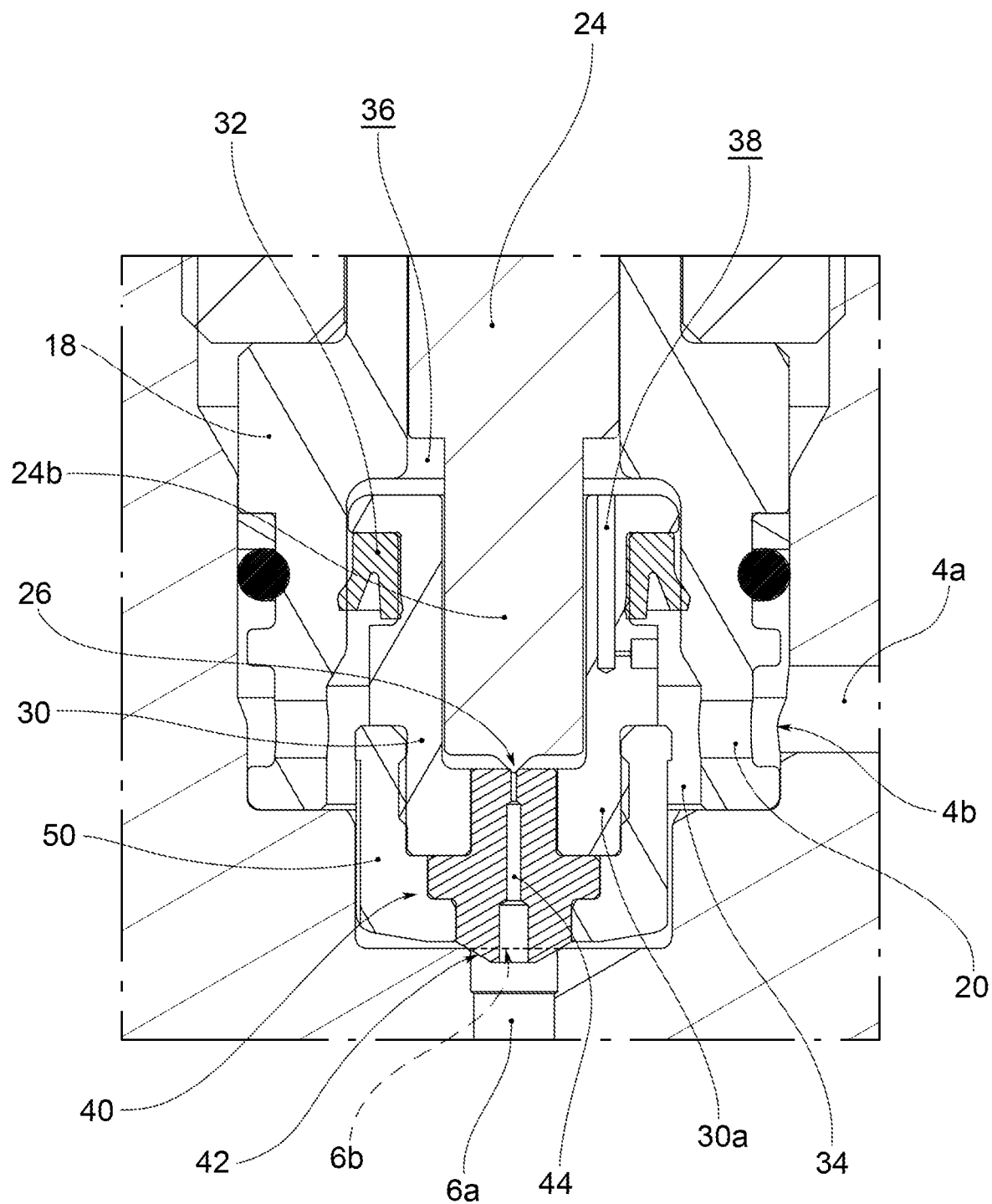
FIG. 2 depicts an enlargement of box II in FIG. 1.

In the normal operation of the ON/OFF valve 1, in an initial configuration or closing configuration (FIGS. 1 and 2), there is no supply of electric current to socket 12, whereby the fixed core 22 and the movable core 24 are not magnetically attracted.

In such a configuration, the biasing means work on the movable core 24, pushing it away from the movable core, so that the first gate 26, which is integral with the movable core 24, sealingly engages opening 46 of the sealing element 40, thus closing the seal passage 44. The first gate 26 forms the so-called "first-stage seal" with opening 46.

Accordingly, since the sealing element 40 is integral with the end portion 30a of drawer 30 and said drawer 30 sealingly slides in the compartment inside the end portion 18 of jacket 16, the sealing element 40 is carried by the biasing means, forcibly abutting against the peripheral edge of port 6b of the initial section 6a of the outlet duct 6.

The main sealing surface 42 of the sealing element 40 thus sealingly engages port 6b, closing the access to the outlet duct 6. The main sealing surface 42 forms the so-called "second-stage seal" with port 6b.

In such a configuration, there is high pressure gas in the inlet duct 4 and, through the jacket passages 20, in the downstream area 34 which is separate from the initial section 6a of the outlet duct 6 by virtue of the seal formed by the sealing element 40 on port 6b.

The high pressure gas also occupies, through the drawer passage 38, the upstream area 36 which is separate from the element passage 44 (and therefore from the outlet duct 6) by virtue of the seal formed by the first gate 26 with the opening 46 of the element passage 44.

Following the supply of an electric current to socket 12, winding 14 generates a magnetic field which magnetizes the fixed core 22 and the movable core 24 with opposite polarities so as to attract each other; therefore, the movable core 24 approaches the fixed core 22, thus overcoming the contrary action of the biasing means.

Figure 3:
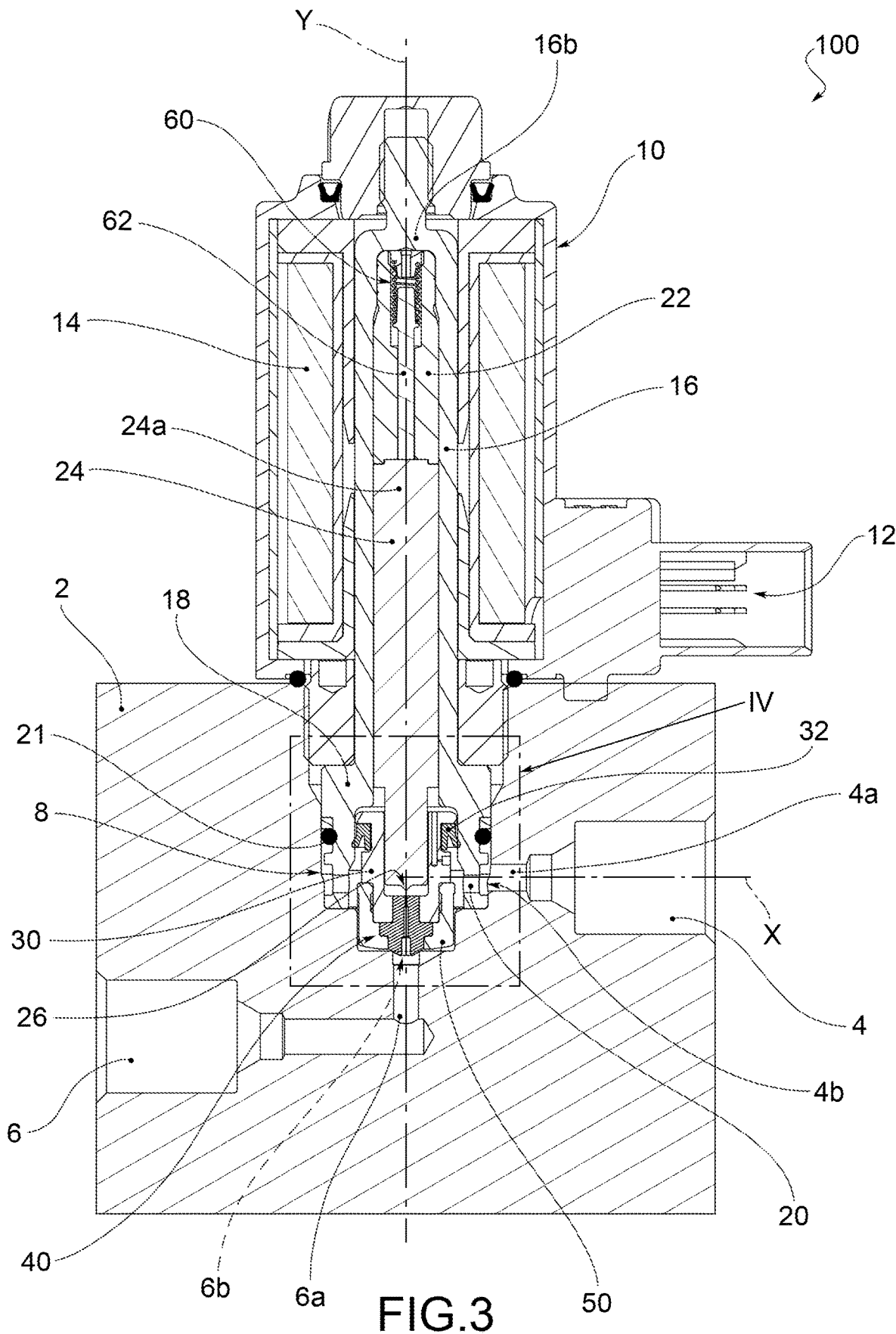
FIG. 3 shows the ON/OFF valve in FIG. 1, in an intermediate or first-stage opening configuration.
Figure 4:
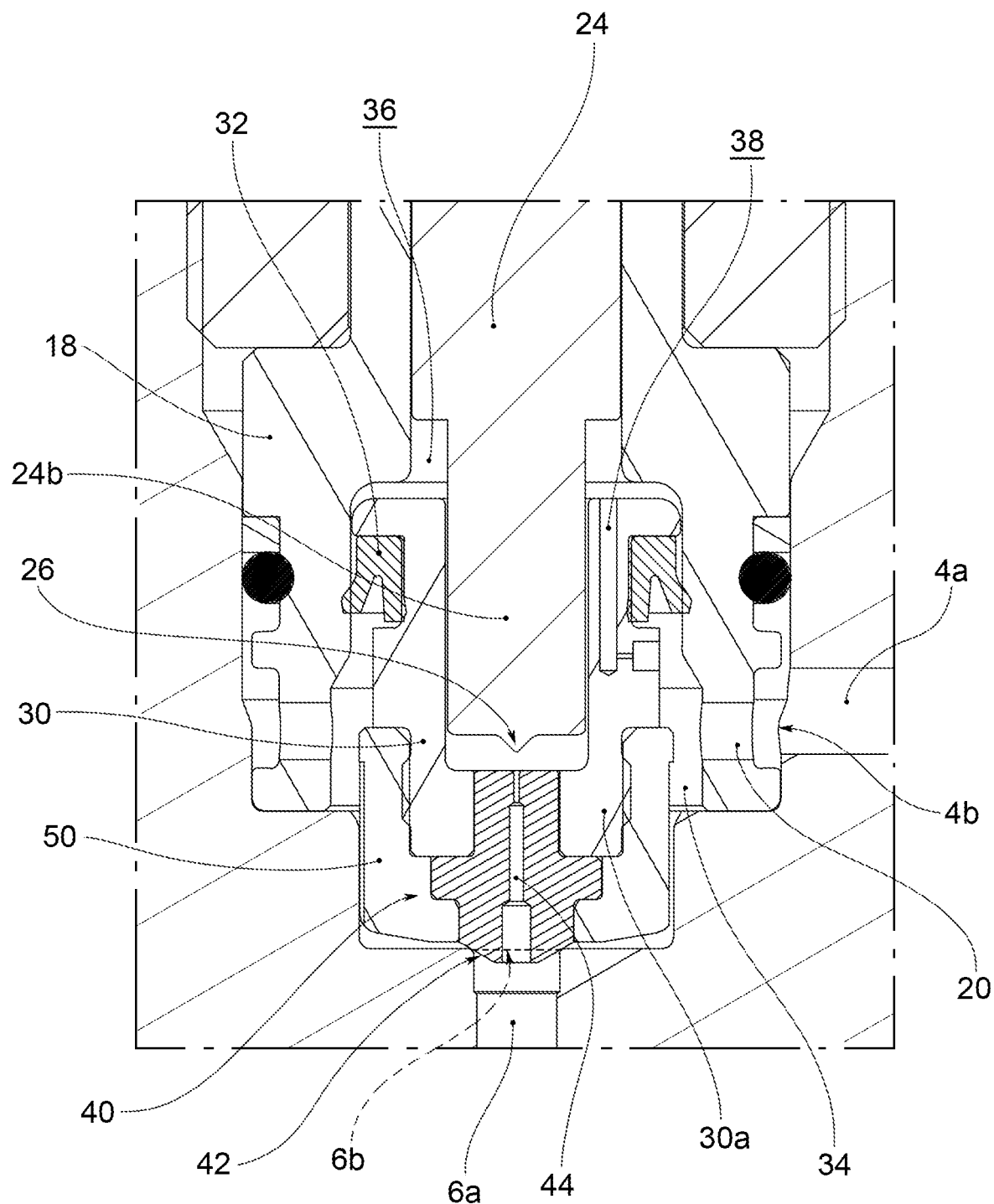
FIG. 4 shows an enlargement of box IV in FIG. 3.

Thus, valve 1 passes to an intermediate or first-stage opening configuration (FIGS. 3 and 4), in which the first gate 26 is sufficiently disengaged from the sealing element 40 so as not to obtain any seal with opening 46.

Accordingly, the high pressure gas crosses the element passage 44 and reaches the initial section 6a of the outlet duct 6.

This causes an unbalancing of actions on drawer 30, which is raised thus bringing the sealing element 40 therewith, resulting in a lack of seal between the sealing element 40 and port 6b of the initial section 6a.

Figure 5:
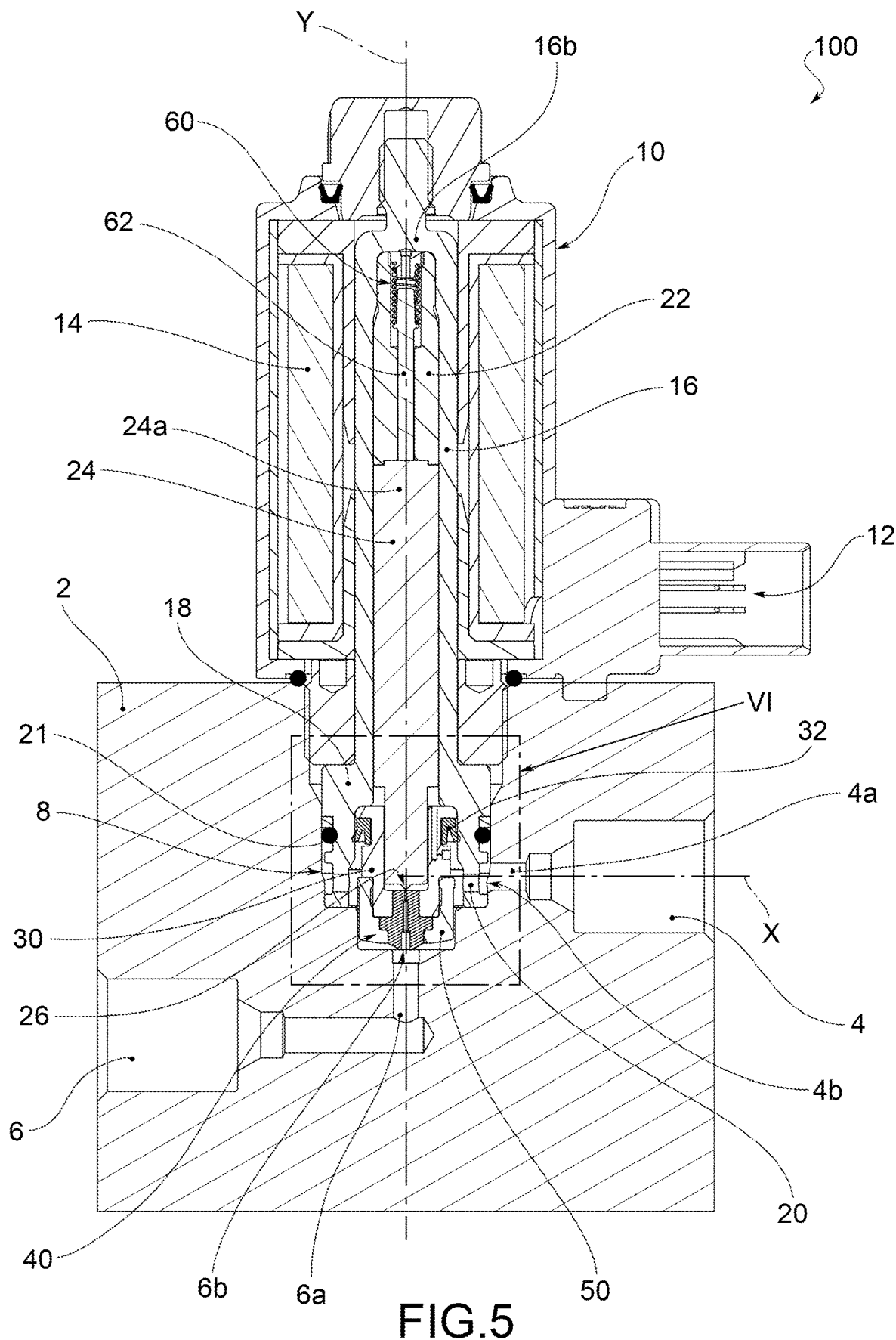
FIG. 5 shows the ON/OFF valve in FIG. 1, in an opening or second-stage opening configuration.
Figure 6:
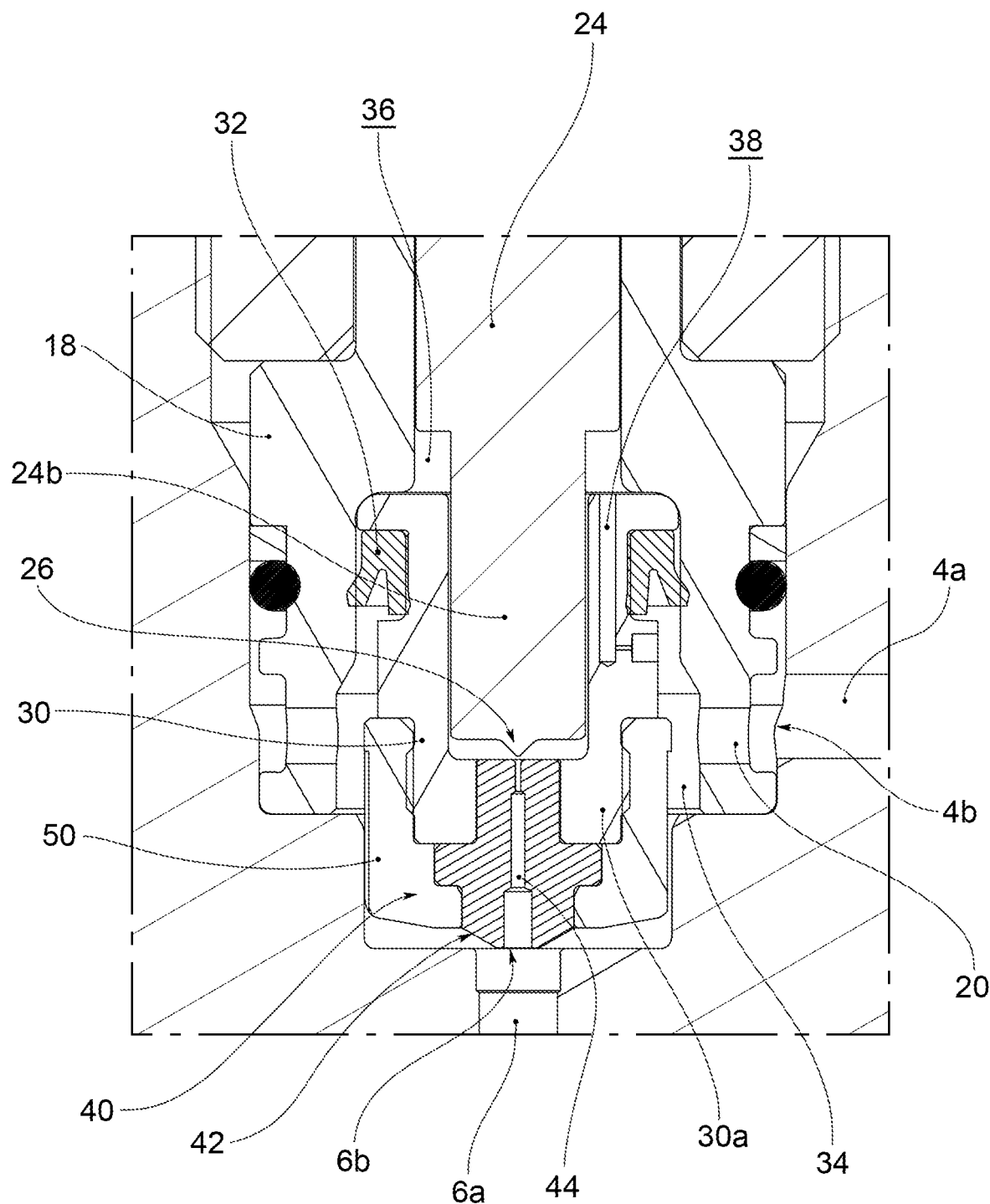
FIG. 6 shows an enlargement of box VI in FIG. 5.
Figure 7A:
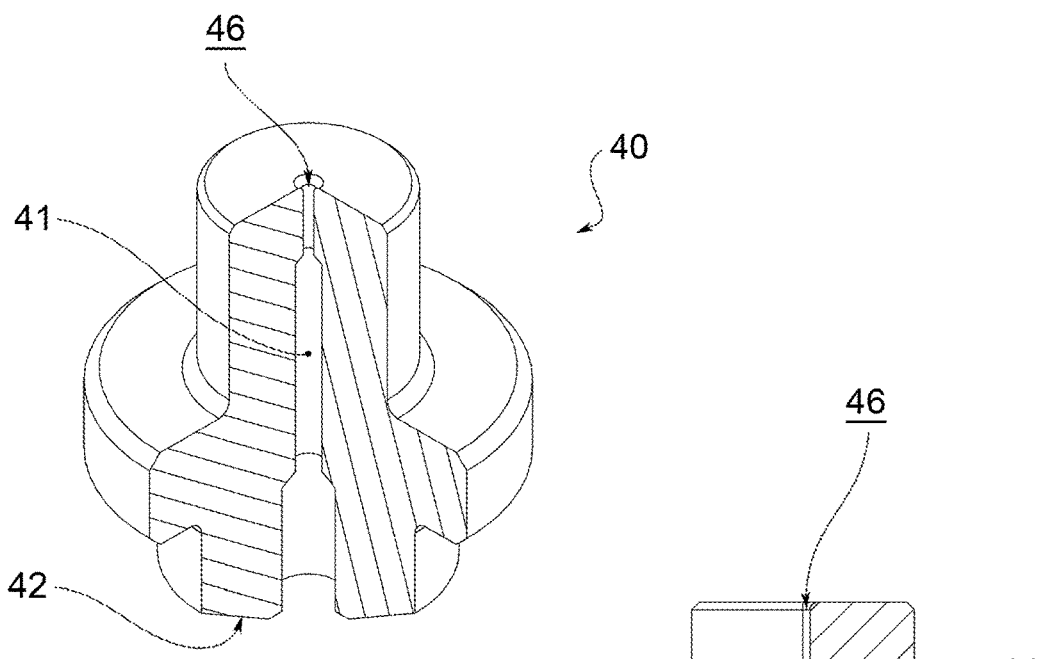
FIGS. 7a to 7c depict a sealing element of the valve according to an embodiment of the present invention.
Figure 7B:
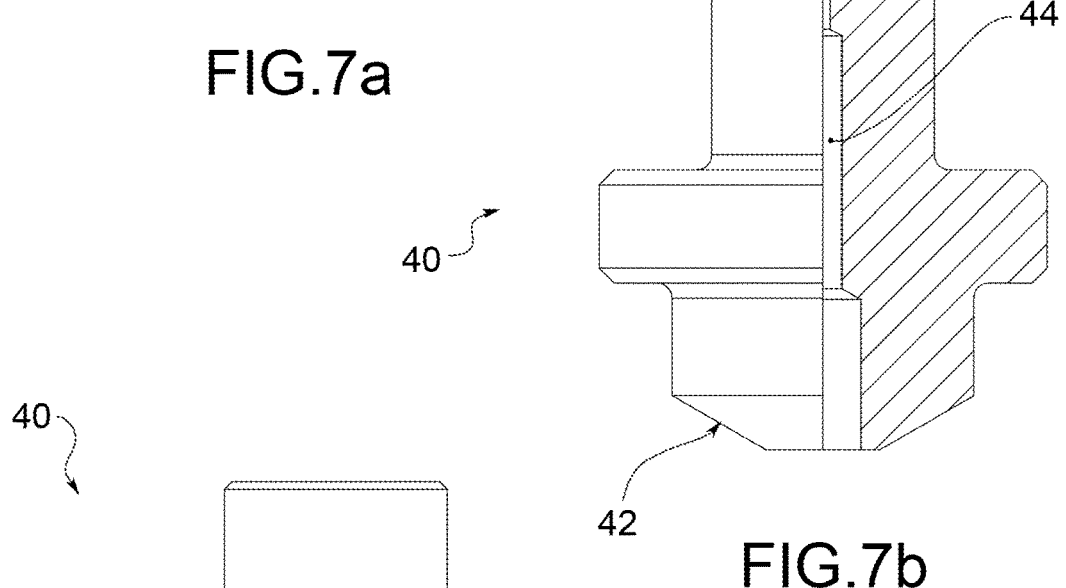
Figure 7C:
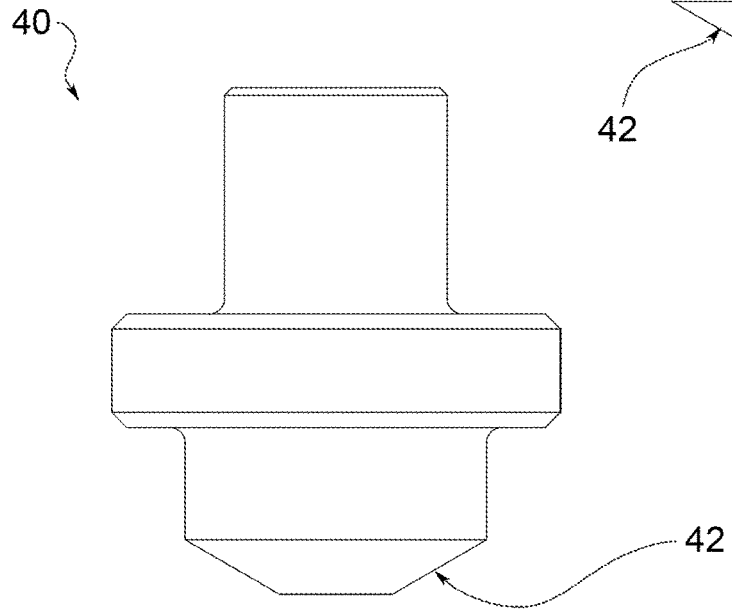
Figure 8A:
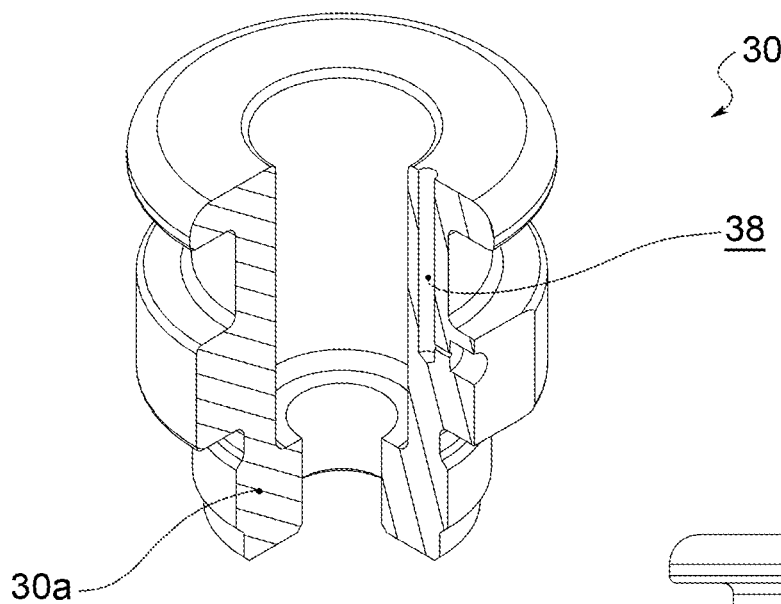
FIGS. 8a to 8c depict a drawer of the valve according to an embodiment of the present invention.
Figure 8B:
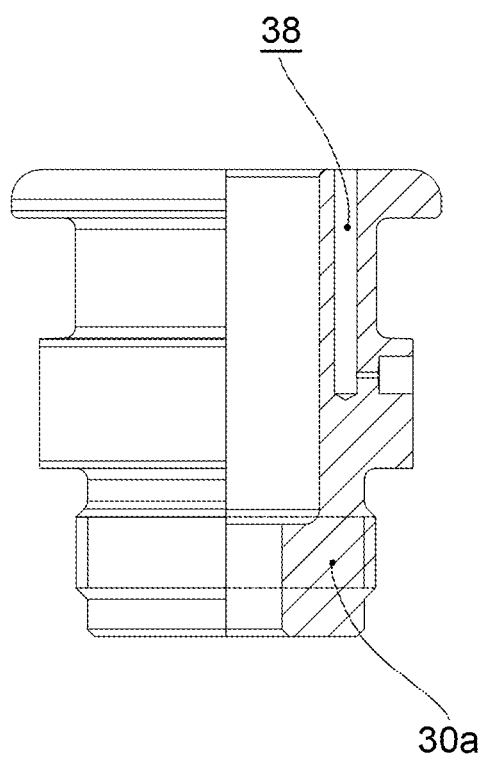
Figure 8C:
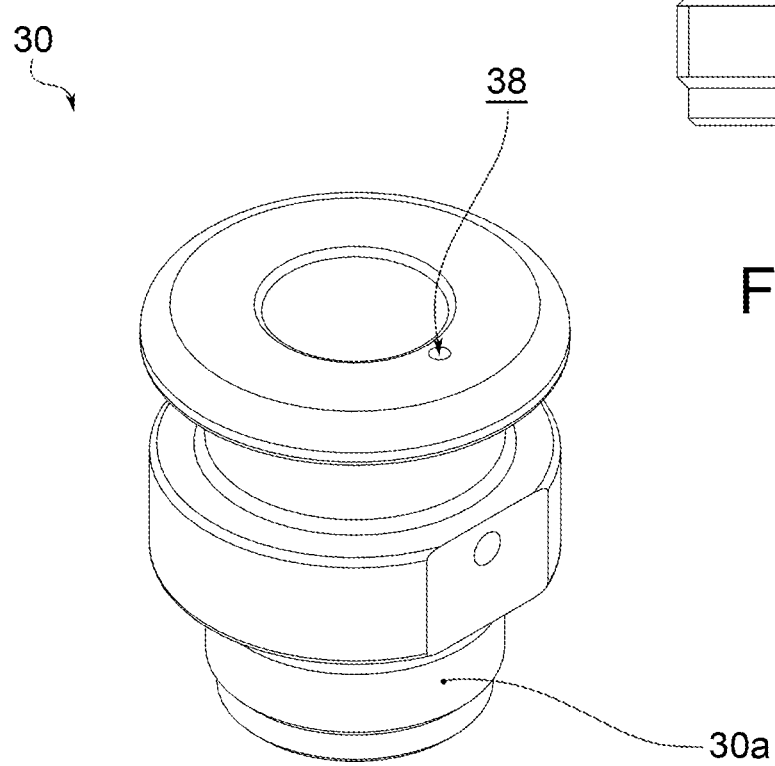

Valve 1 has thus switched to an opening or second-stage opening configuration (FIGS. 5 and 6), in which the main sealing surface 42 of the sealing element 40 is separate from the edge of port 6b of the initial section 6a of the outlet duct 6 so that the high pressure gas may flow from the inlet duct 4 towards the outlet duct 6.

When there is no electric supply to socket 12, the action of the biasing means on the movable core 24 causes the movable core 24 to move away from the fixed core 22 again, the first gate 26 closes the element passage 44, and the conditions of the initial configuration are restored.

According to an alternative embodiment of the invention, the first gate consists of a component which is separate from the movable core but is integral therewith or is biased thereby to be conveniently moved.

According to a further alternative embodiment of the invention, the sealing element consists of several components connected to one another, mechanically or in other manner, so as to obtain a single element.

Innovatively, the ON/OFF valve according to the present invention meets the needs of the field because it ensures an excellent seal against leaks of high pressure gas between inlet and outlet and overcomes the drawbacks of the field because the first-stage seal and the second-stage seal are obtained in the same component (the sealing element) and in a limited area of the valve.

This allows the mechanical processing operations required for a perfect centering of the sealing elements on small surfaces to be concentrated, thus reducing the costs for manufacturing the valve.

It is apparent that, in order to meet contingent needs, those skilled in the art may make changes to the above-described valve, all contained within the scope of protection as defined by the following claims.

What is claimed is:

1. An electrically-operated ON/OFF valve for a high-pressure gas tank, comprising:
    a valve body comprising a main seat, an inlet duct that opens in the main seat with an inlet port and an outlet duct that starts from the main seat with an outlet port;
    a solenoid group connected to the valve body, the solenoid group being electrically-operable and comprising a movable core that is movable in translation by operating the solenoid group;
    a first gate movable by the movable core; and
    a sealing element provided with:
        an element passage having an opening, the first gate being sealingly engaged with the opening to achieve a first-stage seal; and
        a main sealing surface sealingly engaging the outlet port of the outlet duct to achieve a second-stage seal;
    wherein the sealing element is made in one piece, of a polymeric material, so that the first-stage seal and the second-stage seal are both achieved by the sealing element;
    wherein the electrically-operated ON/OFF valve further comprises a drawer that circumscribes at least a portion of the movable core and at least a portion of the sealing element, the drawer comprising a cylindrical inner surface defining an inner compartment, wherein the first gate is slidably housed in the inner compartment, and wherein the sealing element is carried by and jointed with the drawer and the opening opens in the inner compartment of the drawer.

2. The electrically-operated ON/OFF valve of claim 1, wherein the polymeric material of the sealing element is a thermoplastic material.

3. The electrically-operated ON/OFF valve of claim 2, wherein the thermoplastic material is one of polyetheretherketone (PEEK), polyamide-imide (PAI), and VESPEL.

4. The electrically-operated ON/OFF valve of claim 1, wherein the movable core carries the first gate, made in one piece with an end section of the movable core.

5. The electrically-operated ON/OFF valve of claim 4, wherein the first gate consists of a sharp protrusion protruding from the end section of the movable core.

6. The electrically-operated ON/OFF valve of claim 1, wherein the main sealing surface is flared.

7. The electrically-operated ON/OFF valve of claim 1, wherein the element passage connects an inner region of the main sealing surface with the opening.

8. The electrically-operated ON/OFF valve of claim 1, further comprising a fastening body externally screwable to an end portion of the drawer so that the sealing element is encapsulated between the fastening body and the end portion of the drawer.

9. The electrically-operated ON/OFF valve of claim 1, further comprising a fixed jacket, comprising a tubular end portion sealingly housed in the main seat, wherein the drawer is slidably and sealingly housed in the tubular end portion of the fixed jacked jacket, the movable core being slidable inside the fixed jacket.

10. The electrically-operated ON/OFF valve of claim 9, wherein the solenoid group comprises a fixed core housed in the fixed jacket, outside the valve body.

* * * * *